United States Patent
Barrenscheen et al.

(10) Patent No.: US 7,350,015 B2
(45) Date of Patent: Mar. 25, 2008

(54) DATA TRANSMISSION DEVICE

(75) Inventors: Jens Barrenscheen, München (DE); Gunther Fenzl, Neubiberg (DE); Peter Rohm, Pfaffenhofen (DE)

(73) Assignee: Infineon Technologies AG, Munich (DE)

(*) Notice: Subject to any disclaimer, the term of this patent is extended or adjusted under 35 U.S.C. 154(b) by 355 days.

(21) Appl. No.: 10/285,046

(22) Filed: Oct. 31, 2002

(65) Prior Publication Data
US 2003/0084226 A1 May 1, 2003

(30) Foreign Application Priority Data
Oct. 31, 2001 (EP) ............................. 01126002

(51) Int. Cl.
*G06F 13/36* (2006.01)
(52) U.S. Cl. ............. 710/311; 710/27; 710/106; 710/308; 710/310; 710/316
(58) Field of Classification Search ................ 710/22, 710/65, 110, 241, 307, 310, 100, 302, 305, 710/62, 104, 107, 124, 41, 38; 700/20; 370/216, 476; 375/259; 714/746
See application file for complete search history.

(56) References Cited

U.S. PATENT DOCUMENTS

| | | | | |
|---|---|---|---|---|
| 4,970,714 A | * | 11/1990 | Chen et al. ................ 370/216 |
| 5,084,837 A | * | 1/1992 | Matsumoto et al. ......... 710/38 |
| 5,109,490 A | * | 4/1992 | Arimilli et al. ............ 710/110 |
| 5,208,915 A | * | 5/1993 | Stadlmeier et al. .......... 710/22 |
| 5,239,651 A | * | 8/1993 | Sodos ....................... 710/241 |
| 5,280,598 A | * | 1/1994 | Osaki et al. ................ 710/310 |
| 5,287,457 A | | 2/1994 | Arimilli et al. |
| 5,293,381 A | * | 3/1994 | Choy ........................ 370/476 |
| 5,333,294 A | | 7/1994 | Schnell |
| 5,363,494 A | * | 11/1994 | Kudou ....................... 710/307 |
| 5,394,528 A | * | 2/1995 | Kobayashi et al. ......... 710/307 |
| 5,537,659 A | * | 7/1996 | Nakao ....................... 710/307 |
| 5,548,786 A | * | 8/1996 | Amini et al. ................ 710/22 |
| 5,553,244 A | * | 9/1996 | Norcross et al. ........... 710/100 |
| 5,561,820 A | | 10/1996 | Bland et al. |
| 5,574,869 A | | 11/1996 | Young et al. |
| 5,619,726 A | | 4/1997 | Seconi et al. |
| 5,623,697 A | * | 4/1997 | Bland et al. ................ 710/22 |
| 5,652,844 A | * | 7/1997 | Harwood, III ............. 710/104 |
| 5,812,798 A | * | 9/1998 | Moyer et al. ............... 710/307 |

(Continued)

FOREIGN PATENT DOCUMENTS

EP 0 388 300 A2 9/1990

(Continued)

*Primary Examiner*—Christopher E. Lee
(74) *Attorney, Agent, or Firm*—Laurence A. Greenberg; Werner H. Stemer; Ralph E. Locher

(57) ABSTRACT

A data transmission device forwards data that have been received from a first device, intended for a second device, to the second device. The data transmission device is distinguished in that it has connections for connecting at least two data buses and can output data received by a first data bus either onto the same data bus or onto another data bus immediately or later. Therefore, the data transmission device can be used selectively, alternately or simultaneously as a DMA controller and a bus bridge. It also has additional functions unrelated to DMA controllers and bus bridges.

70 Claims, 3 Drawing Sheets

U.S. PATENT DOCUMENTS

| | | | |
|---|---|---|---|
| 5,887,033 A * | 3/1999 | Ueda ............................ | 375/259 |
| 5,901,332 A * | 5/1999 | Gephardt et al. .............. | 710/41 |
| 5,961,616 A * | 10/1999 | Wakasugi et al. ............. | 710/65 |
| 6,101,565 A * | 8/2000 | Nishtala et al. ............... | 710/307 |
| 6,192,431 B1 * | 2/2001 | Dabral et al. .................. | 710/62 |
| 6,434,654 B1 * | 8/2002 | Story et al. .................... | 710/307 |
| 6,490,703 B1 * | 12/2002 | de la Iglesia et al. ......... | 714/746 |
| 6,496,740 B1 * | 12/2002 | Robertson et al. ............. | 700/20 |
| 6,526,470 B1 * | 2/2003 | Cress et al. .................... | 710/307 |
| 6,532,511 B1 * | 3/2003 | Brooks .......................... | 710/305 |
| 6,574,695 B1 * | 6/2003 | Mott et al. ..................... | 710/302 |
| 6,581,115 B1 * | 6/2003 | Arimilli et al. ................. | 710/107 |
| 6,584,526 B1 * | 6/2003 | Bogin et al. ................... | 710/124 |
| 6,640,275 B1 * | 10/2003 | Kincaid .......................... | 710/305 |
| 6,715,011 B1 * | 3/2004 | Buckland et al. .............. | 710/100 |
| 6,732,214 B1 * | 5/2004 | Cohen et al. ................... | 710/305 |

FOREIGN PATENT DOCUMENTS

| | | |
|---|---|---|
| GB | 2 213 685 A | 8/1989 |
| WO | 01/01257 A2 | 1/2001 |

* cited by examiner

DATA TRANSMISSION DEVICE

BACKGROUND OF THE INVENTION

Field of the Invention

The present invention relates to a data transmission device that forwards data, which have been received from a first device, to a second device.

Such data transmission devices are, by way of example, DMA controllers or bus bridges contained, by way of example, in program-controlled units such as microprocessors, microcontrollers, signal processors, etc.

DMA controllers and bus bridges are devices connected to a data bus (DMA controllers) and devices provided between two data buses (bus bridges) which provide efficient transfer of data between further devices connected to the bus or to the buses, more precisely transfer of data which takes place without any relatively high level of loading on a CPU of a program-controlled unit.

The configuration, operation and advantages of use of DMA controllers and bus bridges are known, and therefore there is no need to describe further details.

The fact that modern program-controlled units require transmission of ever greater volumes of data in ever shorter times via the data buses connecting the components of the program-controlled unit to one another results in that, even if DMA controllers and bus bridges are provided, increasingly great difficulties arise in transmitting the data to be transferred with a low level of involvement quickly, easily and efficiently.

To be able to transfer relatively large volumes of data efficiently, in particular with the lowest possible level of loading on the CPU, it is possible to:
a) provide a plurality of bus systems which can be operated independently of one another in order to be able to distribute the data transfers to be formed over the plurality of bus systems;
b) provide all the devices connected to the bus which are able to output or to request relatively large volumes of data in the form of bus masters, so that they can connect directly, i.e. without detour via the CPU or DMA controller, to the data source or to the data destination; and/or
c) equip the devices connected to the bus with buffer-stores (for example FIFOs) so that relatively large volumes of data can be transferred from and/or to the buffer-stores in each case.

These measures require a high level of involvement, however, and also result in the chip in question becoming large and expensive.

SUMMARY OF THE INVENTION

It is accordingly an object of the invention to provide a data transmission device that overcomes the above-mentioned disadvantages of the prior art devices of this general type, which transmits large volumes of data quickly and efficiently with a low level of involvement.

With the foregoing and other objects in view there is provided, in accordance with the invention, a data transmission apparatus for forwarding data received from a first device, intended for a second device, to the second device. The data transmission apparatus contains a data transmission device for receiving and outputting the data. The data transmission device has connections for connecting to at least two data buses, including a first data bus and a second data bus. The data transmission device outputs the data received from the first data bus onto the first data bus or the second data bus immediately or later in time.

In accordance with an added feature of the invention, the data transmission device operates such that the data intended for the second device are selectively only partially forwarded to the second device or not forwarded to the second device.

In accordance with an additional feature of the invention, the data transmission device changes the data intended for the second device before the data are forwarded to the second device.

In accordance with another feature of the invention, the data transmission device operates such that, instead of the data intended for the second device, other data are output to the second device.

In accordance with a further feature of the invention, the data transmission device operates such that the data intended for the second device are forwarded to a further device and to the second device.

In accordance with another added feature of the invention, the data transmission device operates such that a reception of the data from the first device, a fetching of the data from the first device, and/or the forwarding of the data to the second device are ended if the data contain particular data or a particular data sequence.

In accordance with an another additional feature of the invention, the data transmission device operates such that a size of units of the data received and fetched from the first device and a size of units of the data which the data transmission device forwards to the second device can be stipulated independently of one another.

In accordance with another further feature of the invention, the data transmission device is configured to forward to the second device the data output by the first device following an appropriate request from the data transmission device and the data output by the first device is done under an influence of the first device.

In accordance with a concomitant feature of the invention, the data transmission device operates such that the data intended for the second device are forwarded only to a further device.

Other features which are considered as characteristic for the invention are set forth in the appended claims.

Although the invention is illustrated and described herein as embodied in a data transmission device, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

The data transmission device described below is part of a microcontroller in the example under consideration. Alternatively, it could be part of another program-controlled unit, such as a microprocessor or a signal processor, and could also be part of any other device or could be an independent unit without any further parts.

In the example under consideration, the microcontroller, part of which is the data transmission device, contains, besides the data transmission device, one or more CPUs, one or more memories and one or more peripheral units, such as an A/D converter, a D/A converter, a timer, a CAN controller, a USB controller, an OCDS module, etc. For the sake of completeness, it will be noted that the microcontroller can also contain more, fewer or any other components.

The components of the microcontroller are connected to one another via one or more buses. As described in more detail below, the data transmission device can be connected to one or more buses and can be used as a DMA controller or as a bus bridge, or can be used simultaneously or alternately as a DMA controller and as a bus bridge, and can additionally even undertake other tasks which will be discussed in even more detail at a later point.

Figure 1:
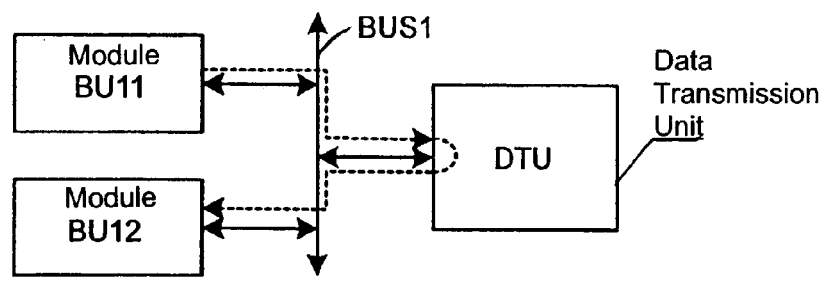
FIG. 1 is a block diagram illustrating a first way in which a data transmission device according to the invention can be used.

Referring now to the figures of the drawing in detail and first, particularly, to FIG. 1 thereof, there is shown a configuration in which a data transmission device is connected "just" to a single bus. In this case, the data transmission device is denoted by the reference symbol DTU, and the bus is denoted by the reference symbol BUS1. Apart from the data transmission device DTU, the bus BUS1 has further components, denoted by the reference symbols BU11 and BU12, of the microcontroller connected to it, and possibly other non-illustrated components.

In the configuration shown in FIG. 1, in which the data transmission device DTU is connected "just" to one bus, the data transmission device DTU can be used "just" as a DMA controller. In this context, it can transmit data from one of the devices connected to the bus BUS1 to another of the devices connected to the bus BUS1 autonomously, i.e. particularly without the assistance of the CPU, upon an appropriate request by one of the components of the microcontroller. In the example illustrated in FIG. 1, the data transmission device DTU in fact transfers data from the device BU11 to the device BU12; this is shown by a dashed arrow.

Figure 2A:
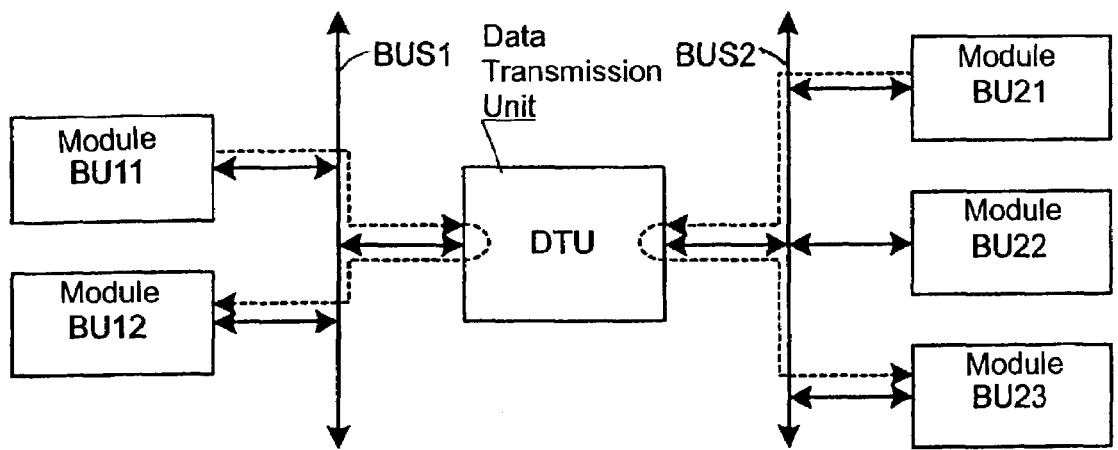
FIGS. 2A and 2B are block diagrams showing two further ways in which the data transmission device can be used.
Figure 2B:
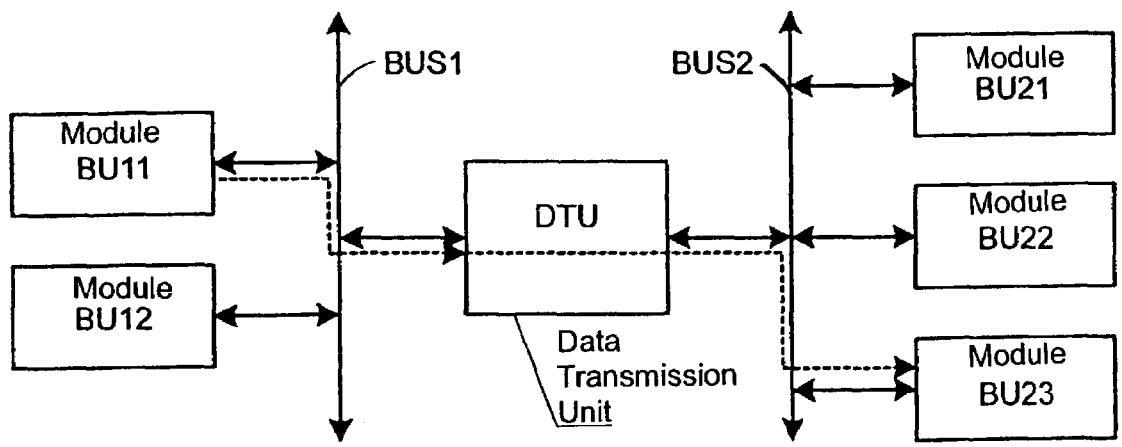

FIGS. 2A and 2B show a configuration in which the data transmission device DTU is connected to the bus BUS1 and additionally to a second bus BUS2, with the second bus BUS2 having, besides the data transmission device DTU, further components of the microcontroller which are denoted by the reference symbols BU21, BU22 and BU23 connected to it, and possibly other non-illustrated components.

In the configuration shown in FIGS. 2A and 2B, in which the data transmission device DTU is connected to the two buses, the data transmission device DTU can be used either as a DMA controller or as a bus bridge, or can be used alternately as a DMA controller and as a bus bridge.

When the data transmission device DTU is used as a DMA controller, it can transmit data from one of the devices connected to the bus BUS1 to another of the devices connected to the bus BUS1 or to a device connected to the bus BUS2 autonomously, i.e. particularly without the assistance of the CPU, upon an appropriate request by one of the components of the microcontroller, or can transmit data from one of the devices connected to the BUS2 to another of the devices connected to the bus BUS2 or to a device connected to the bus BUS1. An example of this is shown in FIG. 2A. In that case, the data transmission device DTU in fact transfers data from the device BU11 to the device BU12 and from the device BU21 to the device BU23; this is shown in FIG. 2A by dashed arrows. The data transmission device DTU is preferably in a form such that data transfers taking place via various buses, that is to say DMA transfers, for example, can take place between the devices BU11 and BU12, and DMA transfers can simultaneously take place between the devices BU21 and BU23.

When the data transmission device DTU is used as a bus bridge, it can transfer data that a device connected to one of the buses outputs onto one bus from one bus to the other bus in order to transmit the data to a device connected to the other bus. An example of this is shown in FIG. 2B: in that case, the data transmission device DTU in fact forwards data which the device BU11 wishes to transmit to the device BU23 from the first bus BUS1 to the second bus BUS2. This is shown in FIG. 2B by a dashed arrow.

Figure 3:
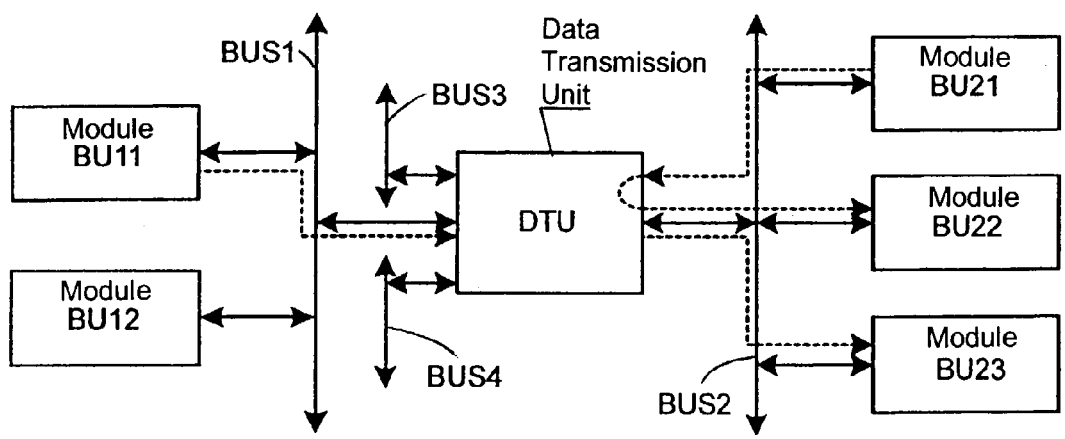
FIG. 3 is a block diagram showing a further way in which the data transmission device can be used.

It ought to be clear that the data transmission device can also be connected to more than two buses. FIG. 3 shows a configuration in which the data transmission device is connected to four buses BUS1 to BUS4.

In the configuration shown in FIG. 3, in which the data transmission device DTU is connected to four buses, the data transmission device DTU can be used either as a DMA controller or as a bus bridge, or alternately as a DMA controller and as a bus bridge, or simultaneously as a DMA controller and as a bus bridge.

The text below describes the configuration of the data transmission device DTU shown in FIG. 4, i.e. a data transmission device configured to be connected to four buses. The basic configuration is shown in FIG. 4.

Figure 4:
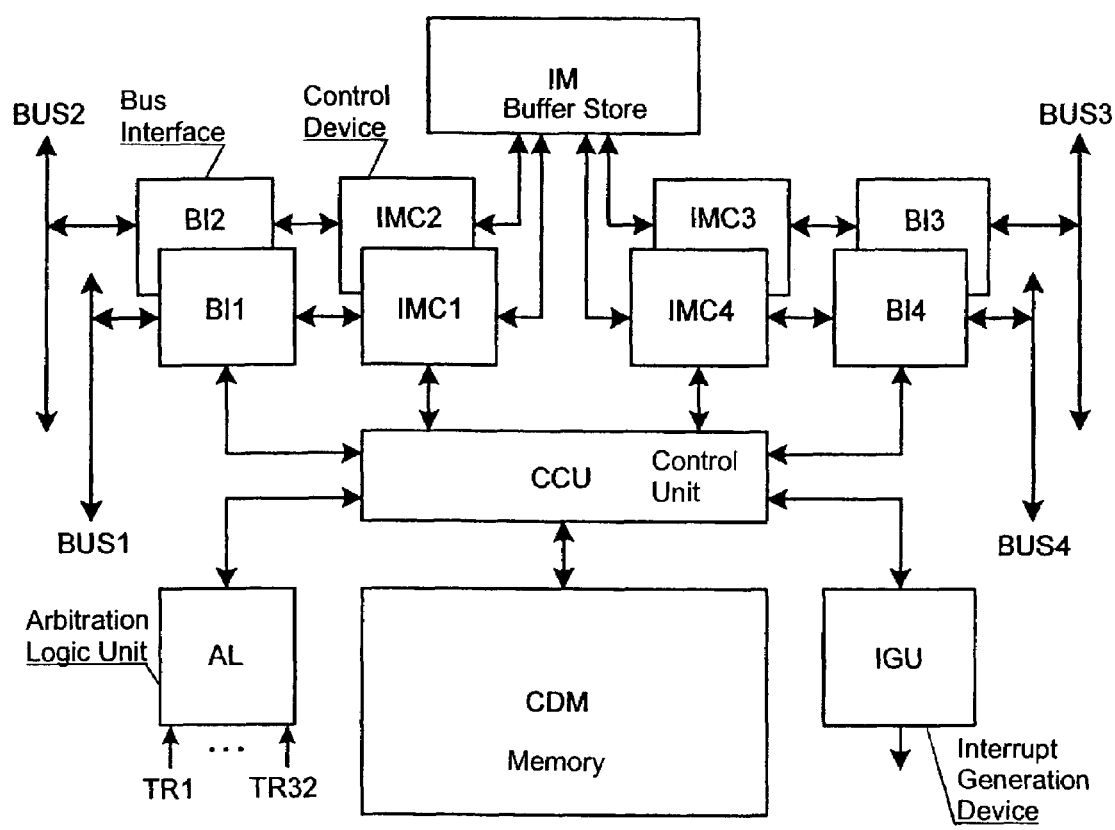
FIG. 4 is a block diagram of a configuration of the data transmission device described below.

In line with FIG. 4, the data transmission device DTU contains a central control unit CCU, a bus interface BI1 used to connect the data transmission device DTU to the first bus BUS1, a bus interface BI2 used to connect the data transmission device DTU to the second bus BUS2, a bus interface BI3 used to connect the data transmission device DTU to the third bus BUS3, a bus interface BI4 used to connect the data transmission device DTU to the fourth bus BUS4, a buffer-store IM, a buffer-store control device IMC1 associated with the first bus interface BI1, a buffer-store control device IMC2 associated with the second bus interface BI2, a buffer-store control device IMC3 associated with the third bus interface BI3, a buffer-store control device IMC4 associated with the fourth bus interface BI4, a configuration data memory CDM, an arbitration logic unit AL, and an interrupt generation device IGU.

Although FIG. 4 does not show this, the buses BUS1 to BUS4 each have a multiplicity of devices (denoted by the reference symbol BU in FIGS. 1 to 3) connected to them.

The task of the data transmission device DTU is to forward data that are received from a first device and are intended for a second device to the second device.

The data which the data transmission device DTU needs to transmit between devices connected to the buses are read in via one of the bus interfaces BIx and are immediately or later (following buffer-storage in the buffer store IM) output via the same or a different bus interface BIx. Data are written to the buffer store IM, and data stored in the buffer store IM are read, under the control of the buffer-store control device IMCx, which is associated with the bus interface BIx which receives the data to be transferred from the associated bus, and the buffer-store control device IMCy, which is associated with the bus interface BIy which outputs the data to be transferred onto the associated bus.

Each bus interface BI1 to BI4 and/or the buffer-store control devices IMC1 to IMC4 associated therewith are also able to undertake further functions. In the example under consideration, these functions involve:

a) data which have been received from the first device and are intended for the second device not or only partially being forwarded to the second device; and/or
b) data which have been received from the first device and are intended for the second device being changed before they are forwarded to the second device; and/or
c) instead of data which have been received from the first device and are intended for the second device, other data being output to the second device; and/or
d) data which have been received from the first device and are intended for the second device being forwarded to another device instead of to the second device or additionally; and/or
e) the reception and/or the fetching of data from the first device and/or the forwarding of the data to the second device being ended if the data received and/or the data to be forwarded contain particular data or a particular data sequence; and/or
f) a size of units in which the data transmission device forwards the data to the second device being stipulated differently than a size of units in which the data transmission device receives or fetches data from the first device.

The bus interfaces BI1 to BI4 and/or the buffer-store control devices IMC1 to IMC4 can be configured by the central control unit CCU on the basis of the respective data transfer to be performed. The configuration data used for the configuration are stored in the configuration data memory CDM and are read therefrom when required by the central control unit CCU, and/or supplied to the data transmission device DTU externally (via one of the buses, for example), and/or generated by the central control unit CCU itself.

The configuration data memory CDM stores a plurality of configuration data records for configuring the bus interfaces BI1 to BI4 and/or the buffer-store control devices IMC1 to IMC4. The configuration data record that is to be used for configuration is selected on the basis of the respective data transfer to be performed. The configuration data record to be used is selected, and the data transmission device components to be configured are configured, by the central control unit CCU. This unit reads the configuration data record to be used from the configuration data memory CDM and configures the data transmission device components to be configured using these data.

Each configuration data record contains the configuration data that need to be used to configure the bus interface BI1 to BI4 and the buffer-store control devices IMC1 to IMC4 so that the respective data transfer to be performed is performed correctly. In the example under consideration, each configuration data record stipulates:

a) whether the data transmission device DTU needs to request an output of the data which are to be transferred;
b) which is the (first) device from which it is necessary to request the output of the data which are to be transferred;
c) what data needs to be requested for output;
d) what volume of data needs to be transferred;
e) which is the (second) device to which the data to be transferred need to be forwarded;
f) the size of the units in which the data to be transferred need to be requested or read in;
g) the size of the units in which the data to be transferred need to be forwarded;
h) whether the received data need to be buffer-stored;
i) where within the buffer store IM the data to be buffer-stored need to be buffer-stored;
j) and the size of the buffer-store location which can be used;
k) how many data items need to be requested or read in from the first device and buffer-stored before they are forwarded;
l) whether data intended for the second device do not need to be forwarded to the second device, or need to be forwarded only partially;
m) the circumstances under which data intended for the second device do not need to be forwarded to the second device or need to be forwarded only partially;
n) what data or data parts do not need to be forwarded to the second device;
o) whether data intended for the second device need to be changed before they are forwarded to the second device;
p) the circumstances under which data intended for the second device need to be changed before they are forwarded to the second device;
q) which of the data intended for the second device need to be changed before they are forwarded to the second device;
r) how, for example using which arithmetic and/or logic operations, the data to be changed need to be changed;
s) whether, instead of data intended for the second device, other data need to be forwarded to the second device;
t) the circumstances under which other data need to be forwarded to the second device instead of the data intended for the second device;
u) instead of which data other data need to be forwarded;
v) which data need to be forwarded instead of the data intended for the second device;
w) whether data intended for the second device need to be forwarded to another device instead of to the second device or additionally;
x) the circumstances under which data intended for the second device need to be forwarded to another device instead of to the second device or additionally;
y) to which other device the data intended for the second device need to be forwarded;
z) what data need to be forwarded to another device instead of to the second device or additionally;
aa) whether the reception and/or the fetching of data from the first device and/or the forwarding of the data to the second device needs to be ended when particular data or a particular data sequence arises; and
bb) what data or what data sequence needs to occur in order for the reception and/or the fetching of data from the first device and/or the forwarding of the data to the second device to be ended.

It ought to be clear and require no further explanation that the stipulations made by the configuration data can also cover more, fewer and/or other stipulations or combinations of those mentioned above.

In the example under consideration, the buffer store IM is a first-in-first-out (FIFO) memory, but can in principle also be a memory organized in any other way.

The arbitration logic AL is connected to input connections TR1 to TR32 on the data transmission device DTU which are used to signal to the data transmission device DTU that a particular DMA transfer needs to be performed, and the arbitration logic decides the order in which the requested DMA transfers are performed.

When required, the interrupt generation device IGU generates an interrupt request signal that signals particular circumstances, such as, in particular, when a requested DMA transfer has been performed or an error that has occurred.

As already mentioned above, the data transmission device DTU can be used selectively, alternately or simultaneously as a DMA controller and/or as a bus bridge.

The text below first describes the use of the data transmission device DTU as a DMA controller.

When one of the components in the microcontroller wishes to prompt a DMA transfer, it signals this to the data transmission device DTU by transmitting a signal which has a particular level and is referred to as a transfer request signal below to one of the input connections TR1 to TR32 on the data transmission device DTU.

The transfer request signal passes from the input connection to which it is supplied into the arbitration logic AL, which uses information which is stored in it and can be changed from outside of the data transmission device DTU in order to ascertain the priority of the requested transfer request and, on the basis of this, stipulates which of the DMA transfers which have already been requested but which have not yet been performed needs to be performed next. The transfer request having the highest associated priority, more precisely a transfer request number that indicates which of the input connections TR1 to TR32 was used to request the transfer request in question, is forwarded to the central control unit CCU. The central control unit CCU reads the configuration data record associated with the transfer request number from the configuration data memory CDM and uses the data to configure the data transmission device components that need to be configured.

It is then possible to start performing the requested DMA request. To this end, the data transmission device DTU first requests allocation of the bus or buses that it needs in order to perform a DMA request. When the data transmission device DTU has been allocated the necessary bus or buses, it executes the DMA request to be executed in the manner prescribed by the preceding configuration.

Provision can also be made for the data transmission device DTU first to request, read in and buffer-store only the data which are to be transferred, but not to start forwarding them until external signaling has indicated to it that it may do so.

If various buses (and hence also various bus interfaces BIx) are required for a plurality of DMA transfers, this plurality of DMA transfers can also be executed simultaneously.

Particularly when there is a relatively large number of DMA transfers which have been requested but not yet executed, it may be found to be advantageous if the DMA transfers are at least temporarily executed not strictly in accordance with the order of their associated priorities, but rather while merely or additionally taking into account the criterion that the greatest possible number of DMA transfers is executed simultaneously in each case.

As can be seen from the above explanations, a single data transmission device of the type described above can execute DMA transfers between any components in the microcontroller, particularly including between those connected to different buses.

If it were desirable to achieve this using conventional DMA controllers, a total of four DMA controllers (1 DMA controller per bus) would need to be provided in the example under consideration, and also the plurality of buses would need to be connected via bus bridges or the like, to which end, if each bus needs to be connected to every other bus via a bus bridge, a total of six bus bridges would need to be provided.

The data transmission device DTU described is therefore found to be advantageous when it is configured or used "just" for carrying out DMA transfers.

For the sake of completeness, it will be noted that the transfer request signal and/or the configuration data to be used for the DMA transfer could also be written to appropriate function registers in the data transmission device DTU.

If the data transmission device DTU is additionally to be used as a bus bridge, it performs the actions described below. Before continuing, it will be pointed out that the data transmission device can also be used exclusively as a bus bridge; in this case, the input connections TR1 to TR32 and the arbitration logic AL can be dispensed with.

When the data transmission device DTU is used as a bus bridge the data transmission device DTU continually evaluates the data transmitted via the buses BUS1 to BUS4 in order to check whether a device which is connected to one of the buses BUS1 to BUS4 currently wishes to transmit data to a device which is connected to another bus, and if this is the case, it transfers the data to be transmitted from one bus to the other bus.

The check on whether a device connected to one of the buses BUS1 to BUS4 currently wishes to transmit data to a device connected to another bus is made by the central control unit CCU. This unit receives from the bus interfaces BI1 to BI4 the data transferred via the buses BUS1 to BUS4 and can establish therefrom whether a device connected to one of the buses BUS1 to BUS4 currently wishes to transmit data to a device connected to another bus.

The check is made by checking whether the address of the device to which data need to be transmitted is the address of a device that is not connected to the same bus as the device outputting the data. To this end, the data transmission device DTU stores the addresses of the devices that are associated with the devices connected to the respective buses. These addresses can be written to the data transmission device DTU, or changed as desired, from outside the data transmission device DTU, more precisely by the CPU or another component in the microcontroller.

If the data transmission device DTU establishes that the device outputting the data and the device for which these data are intended are connected to different buses, it ascertains to which buses the devices in question are connected and configures the bus interfaces BIx connected to these buses and/or the buffer-store control devices IMCx associated with the bus interfaces such that the data to be transferred are forwarded correctly from one bus to the other bus.

The data used to configure the bus interfaces BIx and/or the buffer-store control devices IMCx associated therewith are read from the configuration data memory CDM taking into account the devices or the buses between which data need to be transferred, or are generated by the central control unit CCU itself.

When the bus interfaces BIx and/or the buffer-store control devices IMCx associated therewith have been configured, the data originating from the device outputting the data are accepted from one of the bus interfaces and are immediately or later (following buffer-storage in the buffer store IM) forwarded by the other bus interface to the device for which the data are intended; before the data are forwarded, the bus interface forwarding the data needs to request and be allocated the bus associated with it.

If devices connected to different buses simultaneously wish to transmit data to devices which are connected to various other buses, the data transmission device DTU can transfer the data from one respective bus to the other respective bus simultaneously as well. This makes it possible, for example, for the data transmission device to transfer data from a first bus to a second bus and simultaneously to transfer data from a third bus to a fourth bus, or to transfer data from a first bus to a second bus and simultaneously to read in and buffer-store data to be transferred to the first bus from a third bus, or to output data which have previously been read in and buffer-stored from the third bus onto the first bus, and simultaneously to transfer data from a third bus to a fourth bus.

As explained above, a single data transmission device of the type described above can replace a plurality of bus bridges; if the four buses BUS1 to BUS4 to which the data transmission device shown in FIG. 4 is connected were connected to one another by conventional bus bridges, six conventional bus bridges would need to be provided.

The data transmission device described can also simultaneously be active as a bus bridge and as a DMA controller. This makes it possible, by way of example, for the data transmission device to act as a bus bridge between a first bus and a second bus (to transfer data between these buses) and simultaneously to perform a DMA transfer between two devices connected to a third bus.

The fact that the data transmission device described can simultaneously or alternately transfer data between components of the microcontroller which are connected to the same bus and data between components of the microcontroller which are connected to different buses makes it an extremely simple matter to distribute the components of the microcontroller which are to be connected to one another over a plurality of buses without putting up with drawbacks.

The large number of ways in which it is possible to match the data transmission device to the particular features of the buses connected thereto allow the buses to be operated entirely independently of one another. In particular, they can have different data transmission rates and can operate using different data transmission protocols.

Connecting the components of the microcontroller that are to be connected to one another via a plurality of buses makes it possible for the volume of data which needs to be transferred via each individual bus to be smaller than would be the case if the components of the microcontroller were connected to one another via a single bus, which results in that the time (the latency) which a component needing the bus needs to wait before it can use the bus becomes shorter, and for each of the buses to be able to be relatively short, which results in that they can use a higher data transmission rate than would be the case if the components of the microcontroller were connected to one another just via a single bus.

In this case, provision can also be made for the data transmission device to be the only unit on one or more buses that is able to be bus master on the bus or buses in question.

On the basis of all of this, the data transmission device described is found to be advantageous in a wide variety of respects.

We claim:

1. A data transmission apparatus for forwarding data received from a first device; intended for a second device, to the second device, the data transmission apparatus comprising:
a data transmission device for receiving and outputting the data, said data transmission device having connections for connecting to at least two data buses, including a first data bus and a second data bus, and a buffer storage, said data transmission device outputting the data received from the first data bus onto either the first data bus or the second data bus, immediately, unless the data transmission device is changeably preconfigured for the present respective data transfer, to output the data received from the first bus, later in time, and storing the data received from the first data bus in said buffer storage if the data is to be output later in time, the pre-configuration of said data transmission device being configured for each, respective data transfer using a configuration data record, said configuration data record stipulating whether the data received from the first data bus is to be buffer-stored.

2. The data transmission apparatus according to claim 1, wherein said data transmission device changes the data intended for the second device before the data are forwarded to the second device.

3. The data transmission apparatus according to claim 2, wherein said data transmission device performs the changes to the data by subjecting the data to at least one of logic operations and arithmetic operations.

4. The data transmission apparatus according to claim 2, wherein said data transmission device determines whether the data need to be changed.

5. The data transmission apparatus according to claim 2, wherein said data transmission device determines under what circumstances said data transmission device determines that the data need to be changed.

6. The data transmission apparatus according to claim 2, wherein said data transmission device determines which of the data need to be changed.

7. The data transmission apparatus according to claim 2, wherein said data transmission device determines how the data to be changed need to be changed.

8. The data transmission apparatus according to claim 1, wherein said data transmission device operating such that, instead of the data intended for the second device, other data are output to the second device.

9. The data transmission apparatus according to claim 8, wherein said data transmission device determines whether, instead of the data intended for the second device, the other data are forwarded to the second device.

10. The data transmission apparatus according to claim 8, wherein said data transmission device determines under what circumstances, instead of the data intended for the second device, the other data are forwarded to the second device.

11. The data transmission apparatus according to claim 8, wherein said data transmission device determines which of the data are replaced by the other data that needs to be forwarded.

12. The data transmission apparatus according to claim 8, wherein said data transmission device determines which other data need to be forwarded instead of the data intended for the second device.

13. The data transmission apparatus according to claim 1, wherein said data transmission device operating such that the data intended for the second device are forwarded to a further device and to the second device.

14. The data transmission apparatus according to claim 13, wherein said data transmission device determines whether the data intended for the second device need to be forwarded to the further device and to the second device.

15. The data transmission apparatus according to claim 13, wherein said data transmission device determines under what circumstances the data intended for the second device need to be forwarded to the further device and to the second device.

16. The data transmission apparatus according to claim 13, wherein said data transmission device determines the further device to which the data intended for the second device needs to be forwarded to.

17. The data transmission apparatus according to claim 13, wherein said data transmission device determines which of the data needs to be forwarded to the further device and to the second device.

18. The data transmission apparatus according to claim 1, wherein said data transmission device operating such that at least one of a reception of the data from the first device, a fetching of the data from the first device, and the forwarding of the data to the second device are ended if the data contain one of particular data and a particular data sequence.

19. The data transmission apparatus according to claim 18, wherein said data transmission device determines whether the reception of the data from the first device, the fetching of the data from the first device, and the forwarding of the data to the second device needs to be ended if the data contains the particular data or the particular data sequence.

20. The data transmission apparatus according to claim 18, wherein said data transmission device determines the occurrence of which particular data or which particular data sequence requires that the reception or the fetching of the data from the first device or the forwarding of the data to the second device is ended.

21. The data transmission apparatus of claim 18, wherein a configuration data record stipulates what particular data or particular data sequence needs to occur for said reception of the data from the first device, said fetching of the data from the first device, or said forwarding of the data to the second device to be ended.

22. The data transmission apparatus according to claim 1, wherein said data transmission device operating such that a size of units of the data received and fetched from the first device and a size of units of the data which said data transmission device forwards to the second device can be stipulated independently of one another.

23. The data transmission apparatus according to claim 22, wherein said data transmission device sets the site of the units of the data received from the first device and the size of the units of the data forwarded to the second device.

24. The data transmission apparatus according to claim 1, wherein said data transmission device is configured to forward to the second device the data output by the first device following an appropriate request from said data transmission device and the data output by the first device being done under an influence of the first device.

25. The data transmission apparatus according to claim 24, wherein said data transmission device determines whether the data to be forwarded to the second device are data which said data transmission device needs to request from the first device or are data which are output by the first device under its own influence.

26. The data transmission apparatus according to claim 1, wherein said data transmission device operating such that the data intended for the second device are forwarded only to a further device.

27. The data transmission apparatus according to claim 26, wherein said data transmission device determines whether the data intended for the second device need to be forwarded to the further device.

28. The data transmission apparatus according to claim 26, wherein said data transmission device sets circumstances under which the data intended for the second device need to be forwarded to the further device.

29. The data transmission apparatus according to claim 26, wherein said data transmission device determines the further device to which the data intended for the second device needs to be forwarded to.

30. The data transmission apparatus according to claim 26, wherein said data transmission device determines which of the data needs to be forwarded to the further device.

31. The data transmission apparatus according to claim 1, wherein said data transmission device functions as a DMA controller.

32. The data transmission apparatus according to claim 1, wherein said data transmission device functions as a bus bridge.

33. The data transmission apparatus according to claim 1, wherein said data transmission device functions as one of a bus bridge and a DMA controller.

34. The data transmission apparatus according to claim 1, wherein said data transmission device functions alternately as a bus bridge and as a DMA controller.

35. The data transmission apparatus according to claim 1, wherein said data transmission device functions simultaneously as a bus bridge and a DMA controller.

36. The data transmission apparatus according to claim 1, wherein said data transmission device during a reception of the data from the first device and the forwarding of data to the second device, can simultaneously receive further data from a third device and forward the further data to a fourth device.

37. The data transmission apparatus according to claim 1, wherein said data transmission device does not start to forward the data received until signaling from outside said data transmission apparatus has indicated that it may do so.

38. The data transmission apparatus according to claim 1, wherein said data transmission device contains a configuration data store storing a plurality of sets of configuration data for setting settable parameters.

39. The data transmission apparatus according to claim 38, wherein said data transmission device selects a respective configuration data set to be used on a basis of a respective data transfer to be made.

40. The data transmission apparatus according to claim 38, wherein said configuration data store can have information written to it from outside the data transmission apparatus.

41. A data transmission apparatus for forwarding data received from a first device, intended for a second device, to the second device, the data transmission apparatus comprising:
a data transmission device for receiving and outputting the data, said data transmission device having connections for connecting to at least two data buses, including a first data bus and a second data bus, and a buffer storage, said data transmission device outputting the data received from the first data bus onto either the first data bus or the second data bus, based on a request to said data transmission device, one of immediately and later in time, and storing the data received from the first data bus in said buffer storage if the data is to be output later in time; and
said data transmission device operating such that the data intended for the second device are selectively only partially forwarded to the second device or not forwarded to the second device.

42. The data transmission apparatus according to claim 41, wherein said data transmission device determines whether the data intended for the second device will not be forwarded to the second device or will be forwarded only partially.

43. The data transmission apparatus according to claim 41, wherein said data transmission device determines under what circumstances the data intended for the second device will not be forwarded to the second device or will be forwarded only partially.

44. The data transmission apparatus according to claim 41, wherein said data transmission device determines which of the data or which data sections will not be forwarded to the second device.

45. A data transmission apparatus for receiving data from a first device, intended for a second device, and forwarding the data to the second device, the data transmission apparatus comprising:
a data transmission device for receiving and outputting the data such that the data intended for the second device being selectively only partially forwarded to the second device or not forwarded to the second device.

46. The data transmission apparatus according to claim 45, wherein said data transmission device determines whether the data intended for the second device will not be forwarded to the second device or will be forwarded only partially.

47. The data transmission apparatus according to claim 45, wherein said data transmission device determines under what circumstances the data intended for the second device will not be forwarded to the second device or will be forwarded only partially.

48. The data transmission apparatus according to claim 45, wherein said data transmission device determines which of the data or which data sections will not be forwarded to the second device.

49. A data transmission apparatus for forwarding data received from a first device, intended for a second device, to the second device, the data transmission apparatus comprising:
a data transmission device for receiving and outputting the data such that, instead of the data intended for the second device, other data are output to the second device, based on a configuration data record stipulating that instead of the data intended for the second device, other data are output to the second device.

50. The data transmission apparatus according to claim 49, wherein said data transmission device determines whether, instead of the data intended for the second device, the other data are forwarded to the second device.

51. The data transmission apparatus according to claim 49, wherein said data transmission device determines under what circumstances, instead of the data intended for the second device, the other data are forwarded to the second device.

52. The data transmission apparatus according to claim 49, wherein said data transmission device determines which of the data are replaced by the other data that needs to be forwarded.

53. The data transmission apparatus according to claim 49, wherein said data transmission device determines which other data need to be forwarded instead of the data intended for the second device.

54. A data transmission apparatus for forwarding data received from a first device, intended for a second device, to the second device, the data transmission apparatus comprising:
a data transmission device for receiving and outputting the data, such that the data intended for the second device are forwarded to a further device and the second device, based on a configuration data record stipulating that the data intended for the second device are forwarded to a further device and the second device.

55. The data transmission apparatus according to claim 54, wherein said data transmission device determines whether the data intended for the second device needs to be forwarded to the further device and to the second device.

56. The data transmission apparatus according to claim 54, wherein said data transmission device determines under what circumstances the data intended for the second device need to be forwarded to the further device and the second device.

57. The data transmission apparatus according to claim 54, wherein said data transmission device determines the further device to which the data intended for the second device needs to be forwarded to.

58. The data transmission apparatus according to claim 54, wherein said data transmission device sets which of the data need to be forwarded to the further device and the second device.

59. A data transmission apparatus for forwarding data received from a first device, intended for a second device, to the second device, the data transmission apparatus comprising:
a data transmission device for receiving and outputting the data, said data transmission device being configured in accordance with a configuration data record, to end at least one of a reception of the data from the first device, a fetching of the data from the first device, and a forwarding of the data to the second device, if the data contain one of particular data and a particular data sequence, said configuration data record additionally stipulating what particular data or data sequence needs to occur in order for the reception, the fetching or the forwarding to be ended.

60. The data transmission apparatus according to claim 59, wherein said data transmission device determines whether the reception of the data from the first device, the fetching of the data from the first device, and the forwarding of the data to the second device needs to be ended if the data contains one of the particular data and the particular data sequence.

61. The data transmission apparatus according to claim 59, wherein said data transmission device determines the occurrence of which particular data or which particular data sequence requires that the reception or the fetching of the data from the first device or the forwarding of the data to the second device is ended.

62. A data transmission apparatus for forwarding data received from a first device, intended for a second device, to the second device, the data transmission apparatus comprising:
a data transmission device for receiving and outputting the data, said data transmission device changeably setting a size of units received by said data transmission device from the first device on the basis of a respective data transfer to be performed, said data transmission device additionally changeably setting the size of units received by said data transmission device from the first device and a size of units of the data output by said data transmission device to the second device independently of one another, in accordance with a configuration data record stored in the data transmission device, said configuration data record additionally stipulating how many data items need to be requested or read in from the first device and buffer-stored before they are forwarded to the second device.

63. The data transmission apparatus according to claim 62, wherein the data received from the first device was fetched from the first device.

64. A data transmission apparatus for forwarding data received from a first device, intended for a second device, to the second device, the data transmission apparatus comprising:
a data transmission device for receiving and outputting data, said data transmission device forwarding the data received from the first device to the second device, wherein said data transmission device is configured using a configuration data record to forward to the second device the data output by the first device following an appropriate request from said data transmission device, when said configuration data record stipulates that said data transmission device needs to request an output of the data, and the data output by the first device being done under an influence of the first device.

65. The data transmission apparatus according to claim 64, wherein said data transmission device determines whether the data to be forwarded to the second device are data which said data transmission device needs to request from the first device or are data which are output by the first device under its own influence.

66. A data transmission apparatus for forwarding data received from a first device, intended for a second device, to the second device, the data transmission apparatus comprising:
a data transmission device for receiving and outputting the data such that the data intended for the second device are forwarded only to a further device, based on a configuration data record stipulating that the data intended for the second device are forwarded only to a further device.

67. The data transmission apparatus according to claim 66, wherein said data transmission device determines whether the data intended for the second device needs to be forwarded to the further device.

68. The data transmission apparatus according to claim 66, wherein said data transmission device sets circumstances under which the data intended for the second device need to be forwarded to the further device.

69. The data transmission apparatus according to claim 66, wherein said data transmission device determines the further device to which the data intended for the second device needs to be forwarded to.

70. The data transmission apparatus according to claim 66, wherein said data transmission device determines which of the data needs to be forwarded to the further device.

* * * * *